(12) United States Patent
Naiki

(10) Patent No.: US 6,172,787 B1
(45) Date of Patent: *Jan. 9, 2001

(54) LASER BEAM SCANNING OPTICAL APPARATUS

(75) Inventor: Toshio Naiki, Toyokawa (JP)

(73) Assignee: Minolta Co., Ltd., Osaka (JP)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/835,710

(22) Filed: Apr. 10, 1997

(30) Foreign Application Priority Data

Apr. 10, 1996 (JP) .................................... 8-088003

(51) Int. Cl.⁷ .................................................. G02B 26/08
(52) U.S. Cl. .......................... 359/204; 347/243; 347/244; 347/238; 359/216
(58) Field of Search ............................ 359/204, 212–219, 359/205–207; 347/233–244, 129–130, 137; 362/259

(56) References Cited

U.S. PATENT DOCUMENTS 5,420,712 * 5/1995 Maeda et al. .................... 359/196
5,610,647 * 3/1997 Takada ............................... 359/204

FOREIGN PATENT DOCUMENTS

| 0710005 | 5/1996 | (EP) . |
| 2069176 | 8/1981 | (GB) . |
| 2138162 | 10/1984 | (GB) . |
| 63-208021 | 8/1988 | (JP) . |

* cited by examiner

Primary Examiner—James Phan
(74) Attorney, Agent, or Firm—Sidley & Austin

(57) ABSTRACT

A laser beam scanning optical apparatus which images each laser beam emitted from a laser diode array via a deflector and optical elements and scans the laser beam linearly on a scanning surface at a substantially constant speed. The laser diode array has a plurality of light emitting sources arranged two-dimensionally, and more specifically, arranged in a first direction at uniform intervals of $P_1$ and in a second direction perpendicular to the first direction at uniform intervals of $P_2$ which is different from $P_1$. In the laser beam scanning optical apparatus, the magnification ratio in the main scanning direction and the magnification ratio in the sub scanning direction are different from each other. If there are a number m of light emitting sources in each line of the first direction at the intervals of $P_1$ and a number n of light emitting sources in each line of the second direction at the intervals of $P_2$, the first direction is at an angle θ expressed by the following expression to the main scanning direction:

$\theta=\tan^{-1}(P_2/mP_1)$.

23 Claims, 8 Drawing Sheets

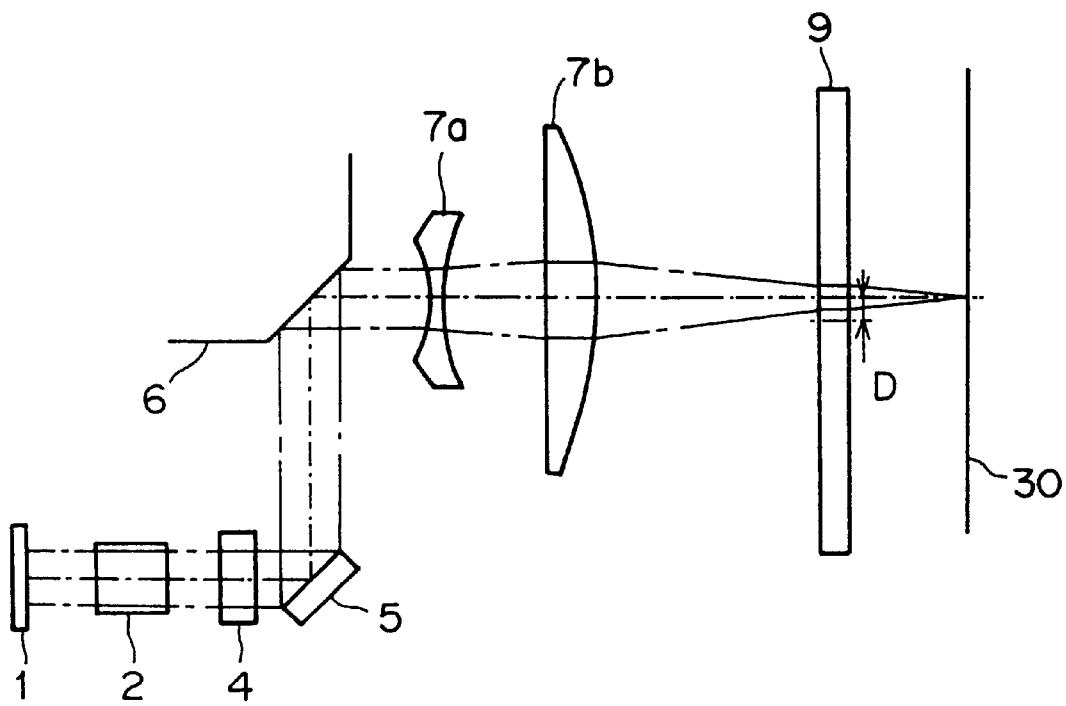
F I G. 2

LASER BEAM SCANNING OPTICAL APPARATUS

FIELD OF THE INVENTION

The present invention relates to a laser beam scanning optical apparatus, and more particularly to a laser beam scanning optical apparatus which is employed in a laser printer or a digital copying machine as printing means.

BACKGROUND OF THE INVENTION

As United Kingdom Patent Nos. GB 2,069,176 and GB 2,138,162, and Japanese Patent Laid Open Publication No. 63-208021 have disclosed, it has been suggested that multi-beam simultaneous exposure at an apparently narrow pitch can be carried out by tilting a linear laser diode array which comprises light emitting sources arranged in a line at comparatively long intervals (for example, approximately 100 μm).

However, such a conventional multibeam scanning optical apparatus which employs a linear laser diode array has the following problems: as the number of light emitting sources increases, a collimator lens with a large effective diameter and a large field of view becomes necessary, which necessitates correction of aberration; and since the angle of view when laser beams are emergent from the collimator lens is large, the dots on a scanning surface after a scanning lens shift in a main scanning direction.

Recently, Photonics Research Incorporated in the U.S.A. developed a surface-emitting laser diode array (trade name: LASE-ARRAY) which is a different type from conventional edge-emitting type linear laser diode arrays. The surface-emitting laser diode array comprises light emitting sources which are arranged at equal intervals in the length direction and in the width direction. Therefore, by using this laser diode array, simultaneous printing of more lines becomes possible without enlarging the effective diameter of the collimator lens.

For example, if the surface-emitting laser diode array has nine light emitting sources which are arranged in three lines in the length direction and in three lines in the width direction at equal intervals of $P_4$, the collimator lens must have an effective diameter of $2 \times (2)^{1/2} P_4$. Compared with a conventional case using an edge-emitting linear laser diode array, the effective diameter of the collimator lens is reduced by approximately 35%. This also inhibits the aberration of the collimator lens. Also, the angle of view when laser beams are emergent from the collimator lens becomes small, and shifts of the dots on the scanning surface in the main scanning direction become small. However, an attempt at simultaneous printing of a plurality of lines by fully using all the light emitting sources of the surface-emitting laser diode array has not been made.

Meanwhile, in a laser beam scanning optical apparatus, generally, the magnification ratio in the main scanning direction is different from that in the sub scanning direction. If a surface-emitting laser diode array which has light emitting sources arranged in two directions at equal intervals is used in such an optical apparatus, the intervals among the projected laser beams in the main scanning direction and those in the sub scanning direction are significantly different. For example, if a surface-emitting laser diode array which has 10 light emitting sources in each line parallel to the main scanning direction and 10 light emitting sources in each line parallel to the sub scanning direction at equal intervals of dozens μm is used in a scanning optical apparatus of which magnification ratio in the main scanning direction is approximately 10 and of which magnification ratio in the sub scanning direction is approximately 1, the intervals among the projected laser beams in the main scanning direction are approximately 10 mm, and those in the sub scanning direction are approximately 1 mm. Thus, the intervals among the projected laser beams in the main scanning direction and those in the sub scanning direction are significantly different.

When the intervals among the projected laser beams in the main scanning direction are large like in such a case, the function of the scanning lens to correct distortion is not sufficiently effective, and eclipses of the laser beams may occur and lower the picture quality. Further, when the intervals among the projected laser beams in the main scanning direction and those in the sub scanning direction are significantly different, design of lenses is narrowly limited, and positioning of the lenses is complicated.

SUMMARY OF THE INVENTION

An object of the present invention is to provide a laser beam scanning optical apparatus which requires a collimator lens with only a small effective diameter and a small field of view, thereby inhibiting aberration.

In order to attain the object, a laser beam scanning optical apparatus according to the present invention comprises: a laser diode array which has a plurality of light emitting sources which are arranged two-dimensionally at uniform intervals of a first distance in a first direction and at uniform intervals of a second distance different from the first distance in a second direction perpendicular to the first direction; a deflector which deflects a plurality of laser beams emitted from the laser diode array; and a scanning system which images the laser beams emitted from the laser diode array on a scanning surface, the scanning system having a magnification ratio in a main scanning direction in which the deflector deflects the laser beams and a magnification ratio in a sub scanning direction perpendicular to the main scanning direction, the magnification ratio in the main scanning direction and the magnification ratio in the sub scanning direction being different.

In the structure above, a collimator lens with only a small effective diameter and a small field of view is required, and correction of the aberration is easy.

Further, if the laser diode array has a number m of light emitting sources in each line of the first direction at uniform intervals of $P_1$ and a number n of light emitting sources in each line of the second direction at uniform intervals of $P_2$, the first direction is at an angle θ expressed by the following expression to the main scanning direction:

$$\theta = \tan^{-1}(P_2/mP_1).$$

By tilting the laser diode array in such a way that the first direction is at the angle θ to the main scanning direction, the apparent intervals among the light emitting sources in the sub scanning direction become smaller. Accordingly, what is required as a collimator lens is one with a smaller effective diameter and a smaller field of view, and correction of the aberration becomes easier.

BRIEF DESCRIPTION OF THE DRAWINGS

This and other objects and features of the present invention will be apparent from the following description with reference to the accompanying drawings, in which:

FIG. 2 is a schematic plan view of the laser beam scanning optical apparatus;

DETAILED DESCRIPTION OF THE PREFERRED EMBODIMENTS

A laser beam scanning optical apparatus is described as an embodiment of the present invention with reference to the accompanying drawings.

Figure 1:
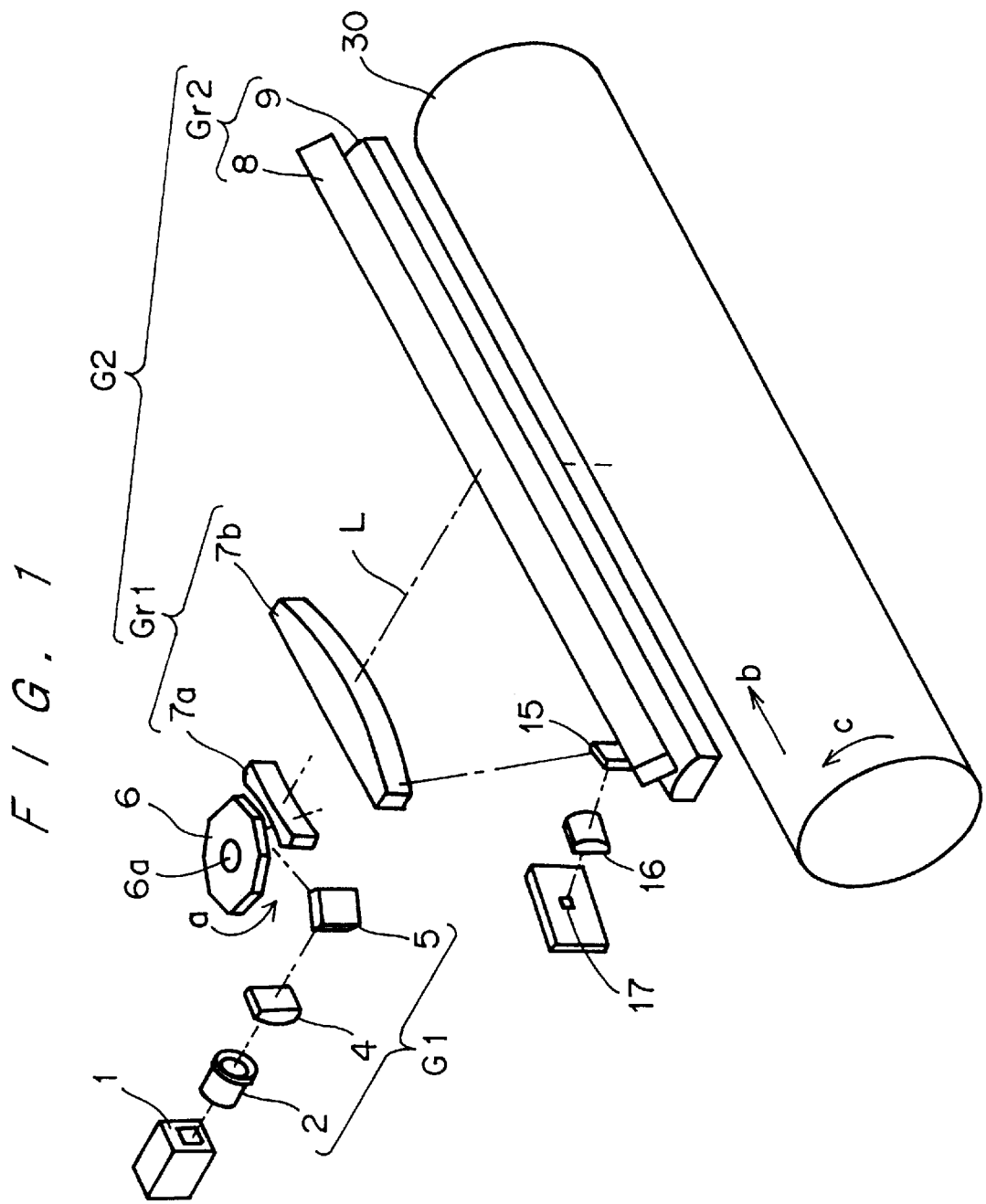
FIG. 1 is a perspective view of a laser beam scanning optical apparatus which is an embodiment of the present invention.

As FIG. 1 shows, the laser beam scanning optical apparatus consists mainly of a laser diode array 1, a first imaging section G1, a polygon mirror 6, a second imaging section G2, an SOS cylindrical lens 16 and an SOS photosensor 17.

The laser diode array 1, as will be described in detail later, has a plurality of (at least three) laser sources arranged two-dimensionally.

The first imaging section G1, naming the members in order from the one closest to the laser diode array 1, comprises a collimator lens 2, a first cylindrical lens 4 and a first reflection mirror 5. The collimator lens 2 has positive refractive powers both in a main scanning direction and in a sub scanning direction and functions to change each laser beam L emitted from the laser diode array 1 into a parallel bundle of rays. The first cylindrical lens 4 has a positive refractive power only in the sub scanning direction and functions to image the laser beam L on a reflective surface of the polygon mirror 6 in a linear form extending in the main scanning direction.

The polygon mirror 6 is an octagonal cylinder, and its eight side surfaces are finished as reflective surfaces. The polygon mirror 6 is driven by a motor (not shown) to rotate in a direction indicated by arrow "a".

The second imaging section G2 is an anamorphic imaging section and functions to image the laser beam L reflected by one of the reflective surfaces of the polygon mirror 6 on a scanning surface. The second imaging section G2 consists of a first lens group Gr1 and a second lens group Gr2.

The first lens group Gr1 is an fθ lens system and comprises a first spherical lens 7a and a second spherical lens 7b. The first spherical lens 7a has spherical concave surfaces on both sides and has a negative refractive power. The second spherical lens 7b has a plane surface in the side of the polygon mirror 6 and a spherical convex surface in the side of the photosensitive drum 30 and has a positive refractive power.

The second lens group Gr2 comprises a second reflection mirror 8 which extends in the main scanning direction and a second cylindrical lens 9 which is a TSL (transformed saddle lens) with a convex surface in the side of the polygon mirror 6 and a plane surface in the side of the photosensitive drum 30. A TSL is a lens which has a refractive power only in the sub scanning direction (does not have a refractive power in the main scanning direction) and has a surface in which a radius of curvature in the sub scanning direction becomes larger as the distance the main scanning direction increases from the center of the lens.

By using such a TSL as the anamorphic imaging lens, the magnification ratio in the sub scanning direction of the scanning optical system can be substantially fixed regardless of the deflection angle of the laser beam on the reflective surface. Thereby, a bow is unlikely to occur, and the beam diameter in the sub scanning direction can be fixed. A bow is a phenomenon wherein a one-line image is formed as an arc when the generatrix of an anamorphic imaging lens shifts in the sub scanning direction with respect to an image surface when the polygon mirror does not have errors in perpendicularity of the reflective surfaces, when the polygon mirror has errors in perpendicularity of the reflective surfaces, or when there are both the above-described errors of the imaging lens and of the polygon mirror.

The axis of symmetry of the second cylindrical lens 9 which is a portion with the minimum radius of curvature of the TSL does not agree with the optical axis of the first lens group Gr1. As FIG. 2 shows, the axis of symmetry of the second cylindrical lens 9 (denoted by "D" in FIG. 2) is located upstream of the optical axis in the main scanning direction.

Each of the light emitting sources of the laser diode array 1 is modulated (turned on and off) in accordance with print data and emits a laser beam L when it is on. The laser beam L is changed into a substantially parallel bundle of rays (or a convergent bundle of rays) by the collimator lens 2 and is converged only in the sub scanning direction by the first cylindrical lens 4, and then, the laser beam L is directed to the polygon mirror 6 by the reflection mirror 5. At this time, the laser beam L is imaged with respect to the sub scanning direction on a point near a reflective surface of the polygon mirror 6 because of the first cylindrical lens 4, but with respect to the main scanning direction, the laser beam L is still a parallel bundle of rays. Therefore, the laser beam L is imaged on a reflective surface of the polygon mirror 6 in a linear form extending in the main scanning direction.

The polygon mirror 6 is driven to rotate on a rotary shaft 6a in the direction of arrow "a" at a constant speed. In accordance with the rotation of the polygon mirror 6, the laser beam L is deflected by the reflective surfaces at a constant angular velocity. Then, the laser beam L is incident to the first and second spherical lenses 7a and 7b of the first lens group Gr1 of the second imaging section G2. The first lens group Gr1 is an fθ lens system and functions to make the main scanning speed of the laser beam L on the scanning surface (the surface of the photosensitive drum 30) constant, that is, to correct distortion.

The laser beam L emergent from the first lens section Gr1 is directed toward the photosensitive drum 30 by the second reflection mirror 8 and is incident to the second cylindrical lens 9. Consequently, the laser beam L is imaged on the photosensitive drum 30 with respect to the sub scanning direction by a combination of the refractive power of the first lens section Gr1 and the refractive power of the second lens section Gr2 and is scanned on the photosensitive drum 30 in a direction indicated with arrow "b".

The photosensitive drum 30 is driven to rotate in a direction indicated with arrow "c" at a constant speed, which results in sub scanning. Thus, an image (electrostatic latent image) is formed on the photosensitive drum 30 by the main scanning in the direction of arrow "b" caused by the rotation of the polygon mirror 6 and the sub scanning in the direction of arrow "c".

In the meantime, the leading portion of the laser beam in the main scanning direction is reflected by the mirror 15 and is incident to the SOS photosensor 17 via the SOS cylindrical lens 16. A beam detection signal generated by the SOS photosensor 17 is used to generate a synchronization signal which determines the print start position of each scanning line.

Figure 3:
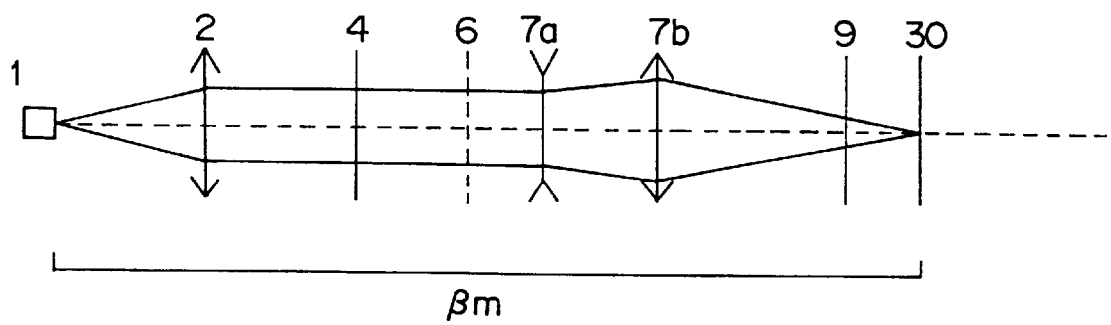
FIG. 3 is a schematic side view of the laser beam scanning optical apparatus which shows refractive powers of optical elements in a main scanning direction.
Figure 4:
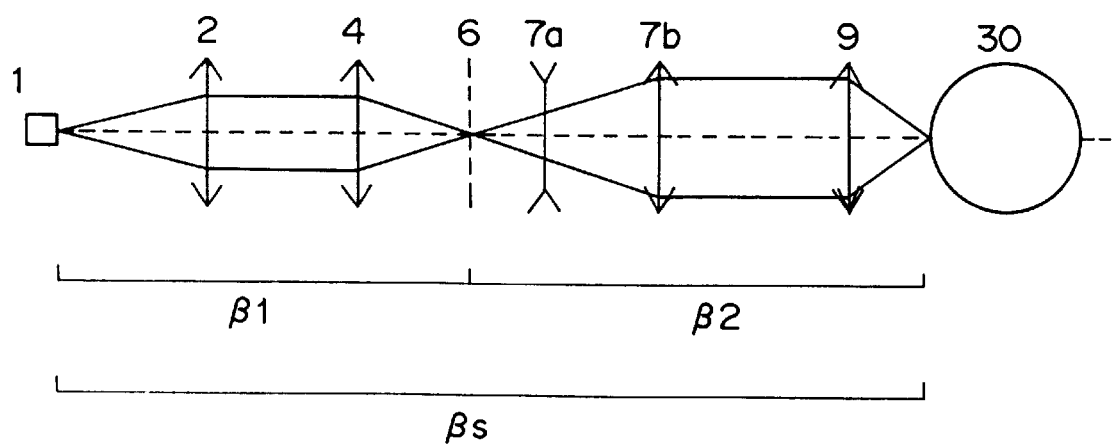
FIG. 4 is a schematic side view of the laser beam scanning optical apparatus which shows refractive powers of the optical elements in a sub scanning direction.

The scanning optical apparatus of this embodiment is an anamorphic optical system of which magnification ratios in the main scanning direction and in the sub scanning direction are different. FIGS. 3 and 4 are schematic views showing the refractive powers of the optical elements of the scanning optical apparatus. FIG. 3 shows those in the main scanning direction, and FIG. 4 shows those in the sub scanning direction. The elements which have refractive powers in the main scanning direction are the collimator lens 2, the first spherical lens 7a and the second spherical lens 7b, and as shown in FIG. 3, the magnification ratio in the main scanning direction of the whole system is denoted by $\beta_m$. The elements which have refractive powers in the sub scanning direction are the collimator lens 2, the first cylindrical lens 4, the first spherical lens 7a, the second spherical lens 7b and the second cylindrical lens 9, and as shown in FIG. 4, the magnification ratio in the sub scanning direction of the whole system is denoted by $\beta_s$. In this scanning optical apparatus, the elements which have refractive powers in the sub scanning direction form a system for correcting errors in perpendicularity of the reflective surfaces of the polygon mirror 6. Accordingly, the magnification ratio in the sub scanning direction of the whole system $\beta_s$ is a combination of the magnification ratio in the sub scanning direction of the first imaging section (from the laser diode array 1 to the polygon mirror 6) $\beta 1$ and that of the second imaging section (from the polygon mirror 6 to the photosensitive drum 30) $\beta 2$.

Next, the structure and the operation of the laser diode array 1 are described.

Figure 5:
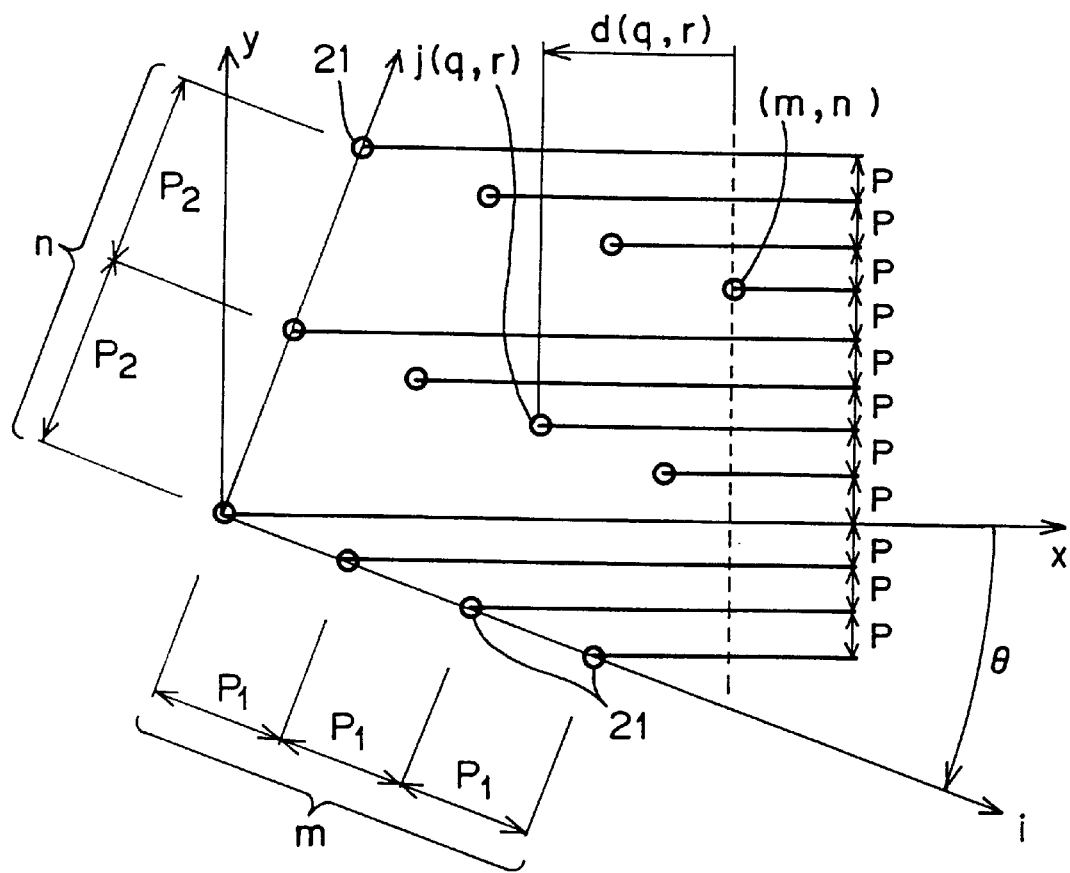
FIG. 5 is an illustration of a laser diode array which shows its tilt.

As FIG. 5 shows, the laser diode array 1 has light emitting sources 21 arranged latticedly in a direction of "i" at uniform intervals of $P_1$ and in a direction of "j" perpendicular to the "i" direction at uniform intervals of $P_2$ ($P_1 < P_2$). There are arranged m light emitting sources in each line extending in the "i" direction, and there are arranged n light emitting sources in each line extending in the "j" direction. The "i" direction is at an angle $\theta$ expressed by the following expression (1) to the main scanning direction (denoted by "x" in FIG. 5). Thereby, the light emitting sources 21 are arranged apparently at uniform and small intervals in the sub scanning direction (denoted by "y" in FIG. 5).

$$\theta = \tan^{-1}(P_2/mP_1) \quad (1)$$

Accordingly, compared with a conventional scanning optical apparatus which employs a linear laser diode array and a scanning optical apparatus in which the laser diode array 1 is arranged in such a way that the "i" direction is parallel to the main scanning direction ($\theta = 0$), the scanning optical apparatus of this embodiment does not require the collimator lens 2 to have so large an effective diameter. This also inhibits aberration caused by the collimator lens 2.

Further, in the scanning optical apparatus, the angle of view when the laser beams are emergent from the collimator lens 2 is small, and shifts of the dots in the main scanning direction on the photosensitive drum 30 are small.

The apparent intervals P of the light emitting sources 21 in the sub scanning direction is expressed by the following expression (2).

$$P = P_1 \sin \theta \quad (2)$$

When laser beams L emitted from the light emitting sources 21 pass through the optical elements 2 through 9 and are imaged on the photosensitive drum 30, the intervals P' of the beam spots on the photosensitive drum 30 is expressed by the following expression (3).

$$P' = P\beta_s \quad (3)$$

$\beta_s$: magnification ratio in the sub scanning direction of the whole system from the light emitting sources 21 to the photosensitive drum 30 The elements of the optical system are designed to make the intervals P' equal to line intervals depending on the print density Pi (dpi). The line intervals are determined as one inch/Pi.

Figure 6:
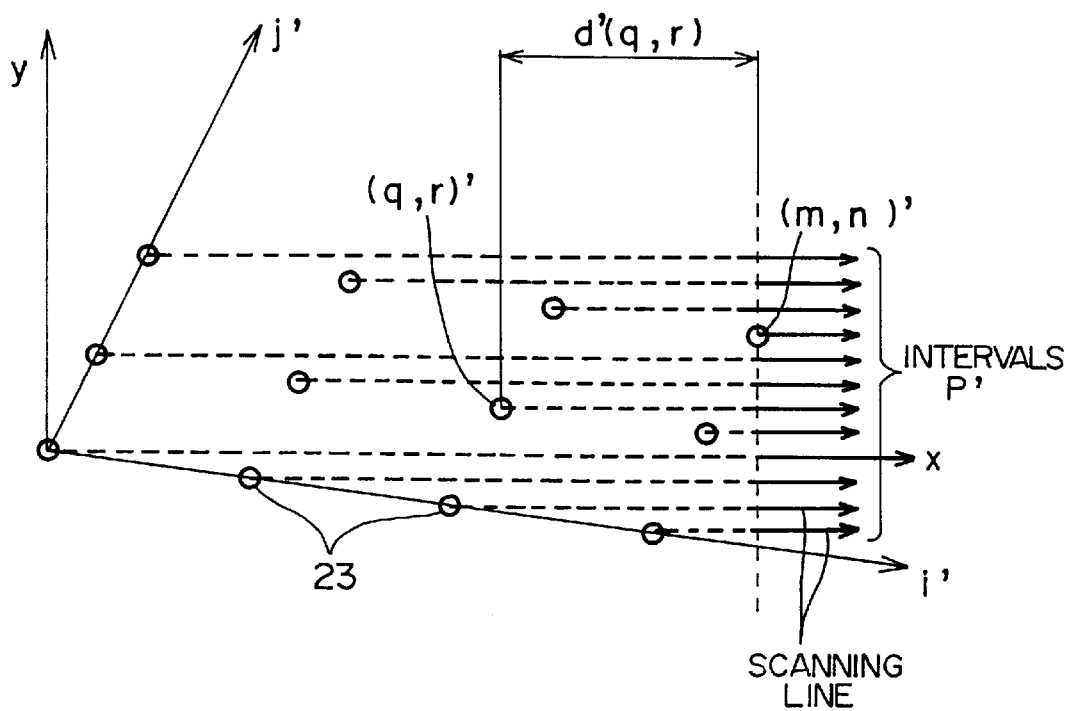
FIG. 6 is an illustration which shows positions of laser beam spots on a photosensitive drum.

FIG. 6 shows the positions of beam spots 23 on the photosensitive drum 30. Since the magnification ratios in the main scanning direction and in the sub scanning direction of the whole system are $\beta_m$ and $\beta_s$ respectively, the light emitting sources 21 which are rectangularly arranged as shown by FIG. 5 are projected on the photosensitive drum 30 in a parallelogram area which is magnified by $\beta_m$ in the main scanning direction ("x" direction) and by $\beta_s$ in the sub scanning direction ("y" direction). At this time, the intervals P among the light emitting sources 21 in the sub scanning direction are uniformly magnified by $\beta_s$. Accordingly, since the apparent intervals P among the light emitting sources 21 in the sub scanning direction are uniform, the intervals P' among the beams on the photosensitive drum 30 are uniform. Therefore, by simultaneously driving all the light emitting sources 21, the same number of lines as the number of light emitting sources 21 can be printed simultaneously, and high-speed printing becomes possible.

However, only with simultaneous driving of all the light emitting sources 21, the print start positions of scanning lines are not aligned. This problem and measures to solve this problem are specifically described.

In the laser diode array 1, the light emitting source which is the "m"th in the "i" direction and the "n"th in the "j" direction is denoted by (m, n), and the light emitting source which is the "q"th in the "i" direction and "r"th in the "j" direction is denoted by (q, r). The laser beam spot on the photosensitive drum 30 of the laser beam emitted from the light emitting source (m, n) is denoted by (m, n)', and that of the laser beam emitted from the light emitting source (q, r) is denoted by (q, r)'. Here, the position of the light emitting source (m, n) is regarded as a reference position. The distance between the light emitting sources (m, n) and (q, r) in the main scanning direction ("x" direction) is denoted by d(q, r), and this distance is magnified by $\beta_m$ on the photosensitive drum 30. More specifically, the distance d'(q, r) between the laser beam spots (m, n)' and (q, r)' in the main scanning direction is expressed by the following expression (4).

$$d'(q,r) = \beta_m d(q, r) \quad (4)$$

Accordingly, when the light emitting sources 21 are driven simultaneously, the start position of line printing by the laser beam emitted from the light emitting source (q, r) shifts from that by the laser beam emitted from the light emitting source (m, n) by the distance d'(q, r) in the main scanning direction ("x" direction). In order to align the print start positions, the drive of the light emitting source (q, r) should be delayed.

Next, the calculation of this delay time t(q, r) is described.

There is a relationship as expressed by the following expression (5) among the scanning speed V (mm/sec) of a laser beam on the photosensitive drum 30, the number of revolutions F (r.p.m.) of the polygon mirror 6 and the scanning distance per radian k (mm/rad) by the second imaging section G2.

$$V = \pi k F/15 \tag{5}$$

The time which it takes the laser beam to move by the distance d'(q, r) at the speed V should be the drive delay time t(q, r) of the light emitting source (q, r) when the light emitting source (m, n) is a reference point. Accordingly, the following expression (6) is obtained.

$$t(q,r) = d'(q, r)/V \tag{6}$$

On the other hand, the following expression (7) is obtained from FIG. 5.

$$d(q,r) = (m-q)P_1 \cos\theta + (n-r)P_2 \sin\theta \tag{7}$$

From the expressions (4) through (7), the following expression (8) is obtained.

$$t(q,r) = 15\beta_m/\pi kF\{(m-q)P_1 \cos\theta + (n-r)P_2 \sin\theta\} \tag{8}$$

Thus, by tilting the laser diode array 1 at the angle θ expressed by the expression (1) to the main scanning direction and delaying the drive of the light emitting source (q, r) from the drive of the reference light emitting source (m, n) by the time t(q, r) expressed by the expression (8), accurate printing on the photosensitive drum 30 becomes possible, and the print start positions of scanning lines on the photosensitive drum 30 can be aligned.

According to employing the laser diode array 1, the intervals among beam spots 23 on the photosensitive drum 30 in the sub scanning direction are different from the intervals among beam spots 23 in the main scanning direction. In this embodiment, the intervals $P_1$ among the light emitting sources 21 in the "i" direction and the intervals $P_2$ among the light emitting sources 21 in the "j" direction are different, and by tilting the laser diode array 1 at an optimal angle θ to the main scanning direction, the intervals among beam spots 23 in the main scanning direction can be made smaller. More specifically, when $P_1 < P_2$ as in this embodiment, the tilting angle θ should be smaller than 90 degrees (see FIG. 5), and when $P_1 > P_2$, the tilting angle θ should be larger than 90 degrees.

Figure 7:
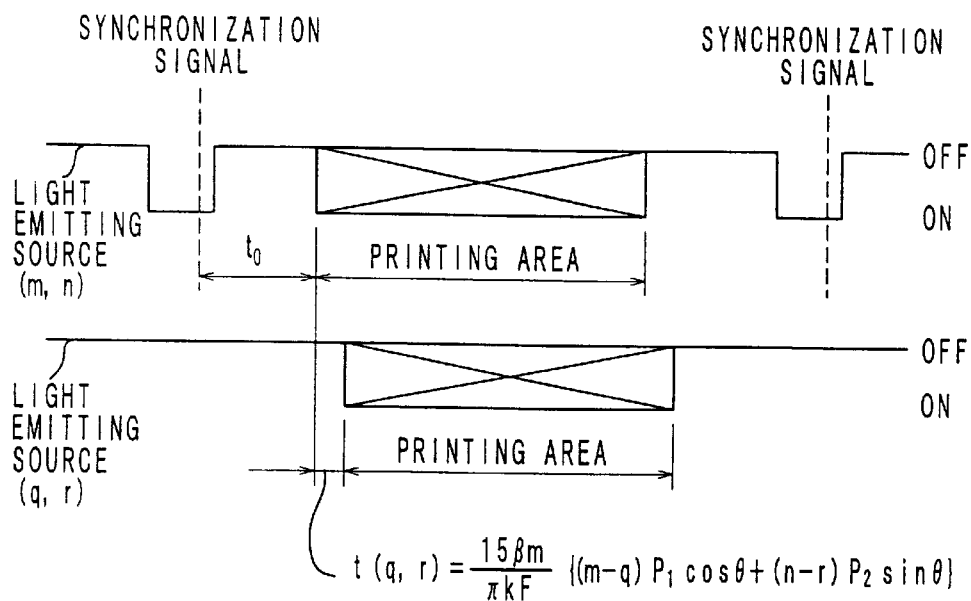
FIG. 7 is a timing chart which shows drive timing of light emitting sources of the laser diode array.

Referring to FIG. 7, the drive timing of the light emitting source (q, r) is described. Driving of the reference light emitting source (m, n) in accordance with print data is started when a time to passes after detection of a synchronization signal by the SOS photosensor 17. Driving of the light emitting source (q, r) in accordance with print data is started after a delay from the drive of the light emitting source (m, n) by the time t(q, r) expressed by the expression (8).

Figure 8:
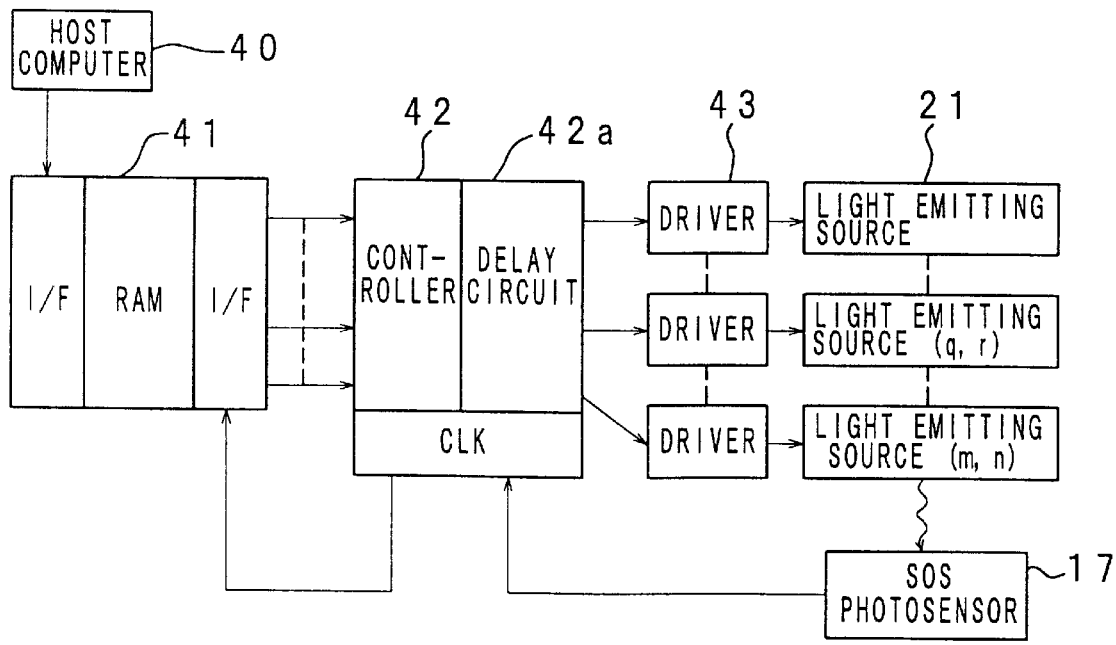
FIG. 8 is a block diagram of a laser diode array driving circuitry.

FIG. 8 shows a laser diode array driving circuitry. The driving circuitry mainly comprises a RAM 41 for storing print data, a controller 42 for controlling the laser diode array 1 and drivers 43 for driving the respective light emitting sources 21 of the laser diode array 1.

When a command signal is sent from a host computer 40 to the RAM 41 via an interface (I/F), respective pieces of print data for the light emitting sources 21 are sent from the RAM 41 to the controller 42. After recognizing generation of the synchronization signal from the SOS photosensor 17, the controller 42 outputs the pieces of print data after specified respective delay times via a delay circuit 42*a*. The pieces of print data which were outputted from the controller 42 with the respective delay times are transmitted to the respective drivers 43, and the drivers 43 drive the corresponding light emitting sources 21 of the laser diode array 1.

Figure 9:
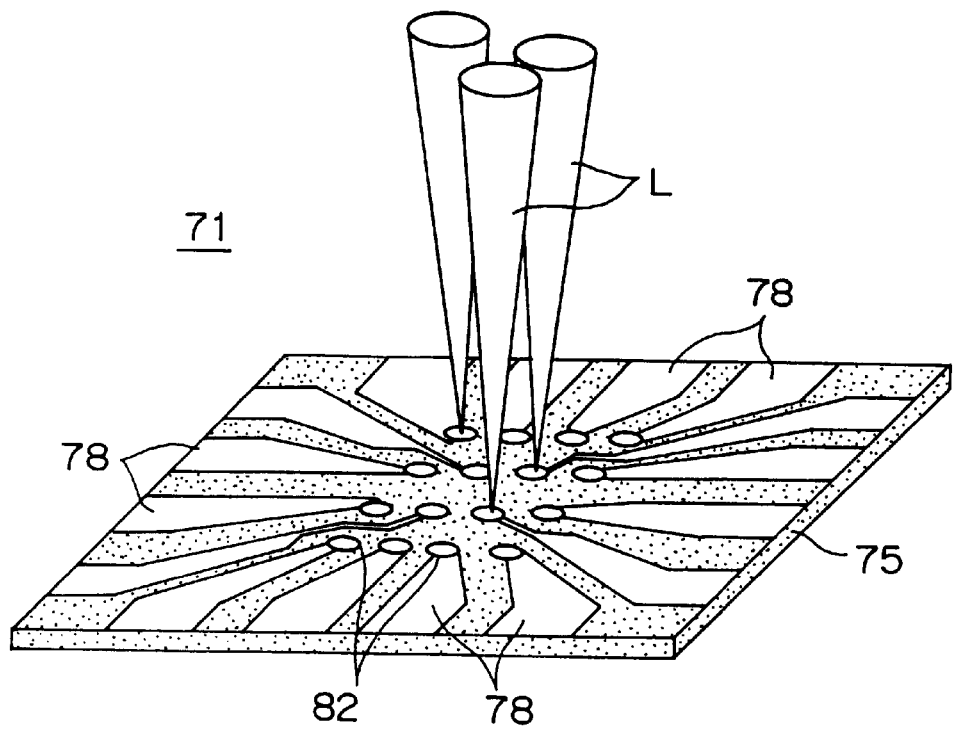
FIG. 9 is a perspective view of a surface-emitting laser diode array.
Figure 10:
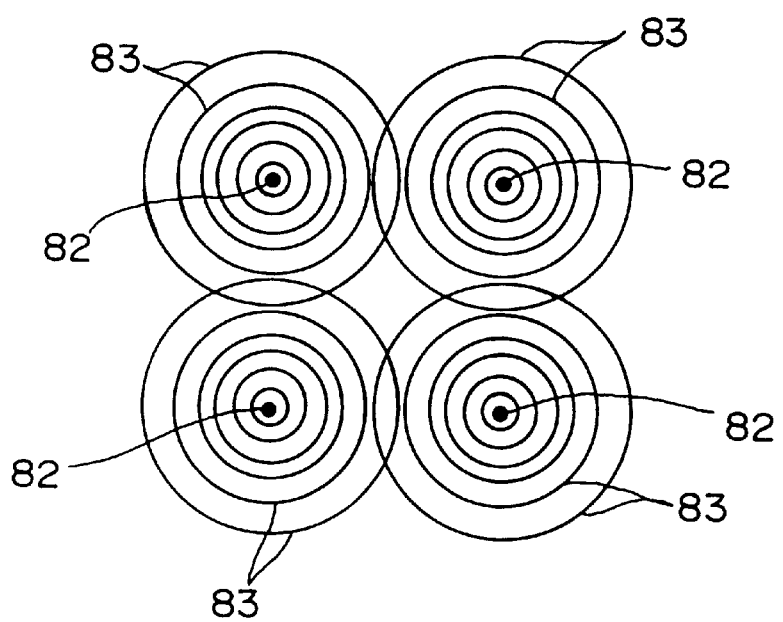
FIG. 10 is a plan view which showing the isotropic spread angle of the surface-emitting laser diode array.

FIG. 9 is a perspective view of a surface-emitting laser diode array (trade name: LASE-ARRAY) 71 manufactured by Photonics Research Incorporated. In the central portion of a rectangular wafer 75, a plurality of light emitting sources 82 are arranged latticedly. Electrodes 78 to which the respective light emitting sources 82 are connected extend to the peripheral portion of the wafer 75. A modulating signal is applied to each of the electrodes 78 in accordance with print data, and when the modulating signal is on, the connected light emitting source 82 emits a laser beam L. The laser beam L emitted from each of the light emitting sources 82 of the laser diode array 71 has an isotropic spread angle, and the laser beam L has an intensity distribution of a circular shape as shown in FIG. 10. In FIG. 10, each curve 83 indicates an equal level.

Therefore, by using the surface-emitting laser diode array 71 in the above-described laser beam scanning apparatus as a light source, the spread angle in the main scanning direction and that in the sub scanning direction are equal. If a conventional edge-emitting type linear laser diode array is provided in the laser beam scanning apparatus to tilt with respect to the main scanning direction, the factors determining the shapes and sizes of beam spots on the photosensitive drum 30, namely, the focal length of the collimator lens, the focal length of the fθ lens and the magnification ratio of the whole optical system need to be changed in accordance with the tilting angle. However, if the surface-emitting laser diode array 71 is provided in the laser scanning optical apparatus to tilt with respect to the main scanning direction, the factors determining the shapes and sizes of beam spots on the photosensitive drum 30 do not have to be changed in accordance with the tilting angle, and the design of the optical apparatus is easy.

In the present embodiment, since the laser diode array 1 which has light emitting sources arranged in a direction at uniform intervals and arranged in a perpendicular direction at different uniform intervals is used, the effective diameter and the field of view of the collimator lens 2 does not have to be enlarged, and aberration can be easily corrected. Further, by tilting the laser diode array 1 at a specified angle, the effect can be further improved. Also, by driving the light emitting sources with respective specified delay times, the scanning optical apparatus can form accurate beam spots on the photosensitive drum aligning the print start positions of scanning lines.

Figure 11:
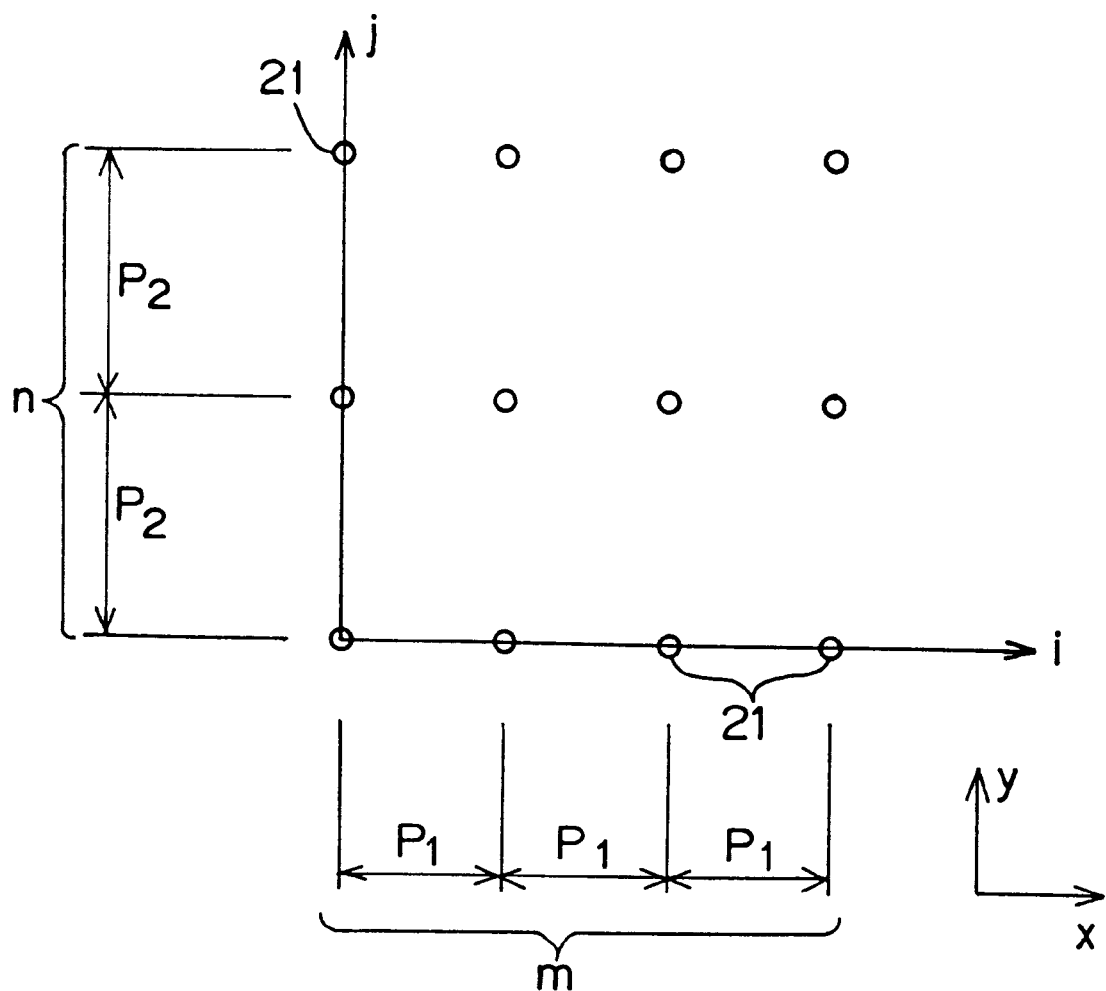
FIG. 11 is an illustration of the laser diode array when the laser diode array is not tilted.

The kinds and arrangement of the optical elements can be arbitrarily designed. In the above-described embodiment, the "i" direction of the laser diode array 1 tilts with respect to the main scanning direction. However, the laser diode array 1 does not have to tilt, and as FIG. 11 shows, the "i" direction may be parallel to the main scanning direction x. In this case, the "j" direction of the laser diode array 1 is parallel to the sub scanning direction y.

Although the present invention has been described in connection with the preferred embodiment above, it is to be noted that various changes and modifications are possible to those who are skilled in the art. Such changes and modifications are to be understood as being within the scope of the present invention.

What is claimed is:

1. A laser beam scanning optical apparatus comprising:

a laser diode array which has a plurality of light emitting sources which are arranged two-dimensionally in a first direction and in a second direction perpendicular to the first direction on a wafer, wherein adjacent light emitting sources in the first direction have an interval of a first dimension and adjacent light emitting sources in the second direction have an interval of a second dimension, wherein said first dimension is different from said second dimension and a relationship between said first dimension and said second dimension is defined by the equation:

$$P_2/P_1 = m(\tan \theta)$$

wherein
$P_2$ is said second dimension,
$P_1$ is said first dimension,
m is a number of light emitting sources in each line of light emitting sources in said first direction, and
$\theta$ is an angle between said first direction and a main scanning direction;

a deflector which deflects a plurality of laser beams emitted from the laser diode array; and a scanning system which images the plurality of laser beams emitted from the laser diode array on a scanning surface, the scanning system having a magnification ratio in said main scanning direction in which the deflector deflects the plurality of laser beams and a magnification ratio in a sub scanning direction perpendicular to the main scanning direction, the magnification ratio in the main scanning direction and the magnification ratio in the sub scanning direction being different.

2. A laser beam scanning optical apparatus as claimed in claim 1, wherein:

the laser beams emitted from the respective light emitting sources are used for simultaneous printing.

3. A laser beam scanning optical apparatus as claimed in claim 2, wherein the second dimension is greater than the first dimension.

4. A laser beam scanning optical apparatus comprising:

a laser diode array which has a plurality of light emitting sources which are arranged two-dimensionally in a first direction and in a second direction perpendicular to the first direction, wherein adjacent light emitting sources in the first direction have an interval of a first dimension and adjacent light emitting sources in the second direction have an interval of a second dimension, wherein said first dimension is different from said second dimension;

a deflector which deflects a plurality of laser beams emitted from the laser diode array; and a scanning system which images the plurality of laser beams emitted from the laser diode array on a scanning surface, the scanning system having a magnification ratio in a main scanning direction in which the deflector deflects the plurality of laser beams and a magnification ratio in a sub scanning direction perpendicular to the main scanning direction, the magnification ratio in the main scanning direction and the magnification ratio in the sub scanning direction being different, wherein the laser diode array has a number m of light emitting sources in each line of the first direction and a number n of light emitting sources in each line of the second direction, wherein the first dimension is a value $P_1$ and the second dimension is a value $P_2$; and the first direction is at an angle $\theta$ to the main scanning direction as expressed by the equation:

$$\theta = \tan^{-1}(P_2/mP_1).$$

5. A laser beam scanning optical apparatus as claimed in claim 4, further comprising a photodetecting member which receives the plurality of laser beams deflected by the deflector and generates a synchronization signal determining a print start position of each scanning line.

6. A laser beam scanning optical apparatus as claimed in claim 5, wherein:

a light emitting source (m, n) which is located in a line m with respect to the first direction and in a line n with respect to the second direction is started to be driven in accordance with print data at a specified time after generation of the synchronization signal from the photodetecting member; and a light emitting source (q, r) which is located in a line q with respect to the first direction and in a line r with respect to the second direction is started to be driven in accordance with print data with a delay time t(q, r) expressed by the following expression from the start of the drive of the light emitting source (m, n):

$$t(q,r) = (15\beta_m/\pi k F) \times \{(m-q)P_1 \cos \theta + (n-r)P_2 \sin \theta\}$$

wherein $\beta_m$ is a magnification ratio in the main scanning direction of the whole optical system, k is a scanning distance per radian (mm/rad), and F is a number of revolutions per minute (rpm) of the deflector.

7. A laser beam scanning optical apparatus as claimed in claim 4, wherein the laser diode array is a surface-emitting laser diode array.

8. A light source device comprising:

a laser diode array having a plurality of light emitting sources, said light emitting sources being arranged two-dimensionally in a first direction and in a second direction perpendicular to the first direction on a wafer, wherein adjacent light emitting sources in the first direction have an interval of a first dimension and adjacent light emitting sources in the second direction have an interval of a second dimension, wherein said first dimension is different from said second dimension and a relationship between said first dimension and said second dimension is defined by the equation:

$$P_2/P_1 = m(\tan \theta)$$

wherein
$P_2$ is said second dimension,
$P_1$ is said first dimension,
m is a number of light emitting sources in each line of light emitting sources in said first direction, and
$\theta$ is an angle between said first direction and a main scanning direction.

9. A light source device as claimed in claim 8, wherein the laser diode array is a surface-emitting laser diode.

10. A laser beam scanning optical apparatus comprising:

a laser diode array which has a plurality of light emitting sources which are arranged two-dimensionally in a first direction and in a second direction perpendicular to the first direction, wherein adjacent light emitting sources in the first direction have an interval of a dimension $P_1$ and adjacent light emitting sources in the second direction have an interval of a dimension $P_2$, wherein the dimension $P_1$ is different from the dimension $P_2$;

wherein the laser diode array has a number m of light emitting sources in each line of light emitting sources in the first direction and a number n of light emitting sources in each line of the second direction; and the first direction is at an angle θ to a main scanning direction as expressed by the following equation:

$$\theta=\tan^{-1}(P_2/mP_1).$$

11. A laser beam scanning optical apparatus comprising:

a laser diode array which has a plurality of light emitting sources arranged two-dimensionally on a wafer, wherein the plurality of light emitting sources are arranged into a plurality of linear light emitting source lines; and a deflector which deflects a plurality of laser beams emitted from the laser diode array and images the laser beams to a scanning surface;

wherein the plurality of light emitting source lines extend in a first direction which is at a specified acute angle to a main scanning direction, wherein a relationship of a dimension between light emitting sources in said first direction to a dimension between light emitting sources in a second direction is defined by the equation:

$$P_2/P_1=m(\tan\theta)$$

wherein $P_2$ is said second dimension between light emitting sources in said first direction, $P_1$ is said first dimension between light emitting sources in said second direction, m is a number of light emitting sources in each line of light emitting sources in said first direction, and θ is an angle between said first direction and a main scanning direction.

12. A laser beam scanning optical apparatus as claimed in claim 11, wherein the plurality of laser beams produces a plurality of beam spots on the scanning surface which have a common interval dimension.

13. A laser beam scanning optical apparatus comprising:

a laser diode array which has a plurality of light emitting sources arranged two-dimensionally, wherein the plurality of light emitting sources are arranged into a plurality of linear light emitting source lines; and a deflector which deflects a plurality of laser beams emitted from the laser diode array and images the laser beams to a scanning surface, wherein the light emitting source lines extend in a direction which is at a specified acute angle to a main scanning direction; and wherein the laser diode array has a number m of light emitting sources in each of said plurality of light emitting source lines, wherein adjacent light emitting sources within said each of said plurality of light emitting source lines have an interval of a dimension $P_1$ and adjacent light emitting source lines have an interval of a dimension $P_2$; and the direction of the light emitting source lines is at an angle θ to the main scanning direction as expressed by the equation:

$$\theta=\tan^{-1}(P_2/mP_1).$$

14. A laser beam scanning optical apparatus comprising:

a laser diode array having a plurality of light emitting sources which are arranged two-dimensionally at uniform intervals of a first distance in a first direction and at uniform intervals of a second distance in a second direction, the second distance being different from the first distance, the second direction being perpendicular to the first direction;

a deflector for deflecting a plurality of laser beams emitted from the plurality of light emitting sources of the laser diode array; and a scanning system for imaging the plurality of laser beams emitted from the light emitting sources of the laser diode array onto a scanning surface, the scanning system having a magnification ratio in a main scanning direction corresponding to a direction in which the deflector deflects the plurality of laser beams and a magnification ratio in a sub scanning direction, the sub scanning direction being perpendicular to the main scanning direction, the magnification ratio in the main scanning direction being different from the magnification ratio in the sub scanning direction, wherein the first direction is inclined at a non-zero angle with respect to the main scanning direction.

15. A laser beam scanning optical apparatus as claimed in claim 14, wherein:

the laser diode array has a number m of light emitting sources in each line in the first direction at uniform intervals of $P_1$ and a number n of light emitting sources in each line in the second direction at uniform intervals of $P_2$; and the first direction is at an angle θ to the main scanning direction as expressed by the following equation:

$$\theta=\tan^{-1}(P_2/mP_1).$$

16. A laser beam scanning optical apparatus as claimed in claim 15, further comprising a photodetecting member for receiving the plurality of laser beams deflected by the deflector and which generates a synchronization signal for determining a print start position of each scanning line.

17. A laser beam scanning optical apparatus as claimed in claim 16, wherein:

a light emitting source (m, n), which is located in a line m with respect to the first direction and in a line n with respect to the second direction, is started to be driven in accordance with print data at a specified time after generation of the synchronization signal from the photodetecting member; and a light emitting source (q, r), which is located in a line q with respect to the first direction and in a line r with respect to the second direction, is started to be driven in accordance with print data with a delay time t(q, r) expressed by the following expression from the start of the drive of the light emitting source (m, n):

$$t(q, r) = \left(\frac{15\beta_m}{\Pi k F}\right) \times [m - qP_1\cos\theta + P_2\sin\theta]$$

wherein $\beta_m$ is the magnification ratio in the main scanning direction of the optical apparatus in its entirety;

k is a scanning distance per radian (mm/rad); and

F is a number of revolutions per minute (rpm) of the deflector.

18. A laser beam scanning optical apparatus as claimed in claim 15, wherein the laser diode array is a surface-emitting laser diode array.

19. A laser beam scanning optical apparatus as claimed in claim 14, wherein the second distance is greater than the first distance.

20. A light source device for a scanning optical apparatus, said scanning optical apparatus having a main scanning direction, said light source device comprising:

a laser diode array having a plurality of light emitting sources, said light emitting sources being arranged two dimensionally at uniform intervals of a first distance in a first direction and at uniform intervals of a second distance in a second direction, the second distance being different from the first distance, the second direction being perpendicular to the first direction, wherein the first direction is inclined at a non-zero angle with respect to said main scanning direction.

21. A light source device as claimed in claim 20, wherein the laser diode array is a surface-emitting laser diode array.

22. A light source device as claimed in claim 20, wherein the second distance is greater than the first distance.

23. A method of scanning a surface comprising the steps of:

providing a laser diode array having a plurality of light emitting sources, said light emitting sources being arranged two dimensionally at uniform intervals of a first distance in a first direction and at uniform intervals of a second distance in a second direction, the second distance being different from the first distance, the second direction being perpendicular to the first direction, wherein the first direction is inclined at a non-zero angle with respect to a main scanning direction;

deflecting a plurality of laser beams emitted from the plurality of light emitting sources of laser diode array; and imaging the plurality of laser beams emitted from the laser diode array onto a scanning surface in a main scanning direction and in a sub scanning direction, the sub scanning direction being perpendicular to the main scanning direction.

* * * * *